US010275728B2

(12) United States Patent
Makhoul (10) Patent No.: US 10,275,728 B2
(45) Date of Patent: Apr. 30, 2019

(54) SYSTEM AND METHOD FOR CAPTURING USER ACTIVITY USING WEARABLE DEVICES

(71) Applicant: Elie Nehme Makhoul, Mississauga (CA)

(72) Inventor: Elie Nehme Makhoul, Mississauga (CA)

( * ) Notice: Subject to any disclaimer, the term of this patent is extended or adjusted under 35 U.S.C. 154(b) by 0 days.

(21) Appl. No.: 15/746,037

(22) PCT Filed: Jul. 19, 2016

(86) PCT No.: PCT/CA2016/000195
§ 371 (c)(1),
(2) Date: Jan. 19, 2018

(87) PCT Pub. No.: WO2017/011896
PCT Pub. Date: Jan. 26, 2017

(65) Prior Publication Data
US 2018/0211198 A1  Jul. 26, 2018

Related U.S. Application Data

(60) Provisional application No. 62/194,270, filed on Jul. 19, 2015.

(51) Int. Cl.
*G06Q 10/06* (2012.01)
*G07C 1/10* (2006.01)
(Continued)

(52) U.S. Cl.
CPC ..... *G06Q 10/063114* (2013.01); *G06Q 10/06* (2013.01); *G07C 1/10* (2013.01);
(Continued)

(58) Field of Classification Search
CPC ........... G06Q 10/063114; G06Q 10/06; H04M 1/7253; H04W 4/029; H04W 4/026
(Continued)

(56) References Cited

U.S. PATENT DOCUMENTS

| 2013/0065584 | A1* | 3/2013 | Lyon | H04W 28/06 455/434 |
| 2014/0354529 | A1* | 12/2014 | Laughlin | G06F 3/017 345/156 |
| 2016/0342928 | A1* | 11/2016 | Godwin | G06Q 10/063 |

OTHER PUBLICATIONS

International Search Report dated Sep. 27, 2016, PCT/CA2016/000195 filed Jul. 19, 2016, inventor Makhoul, Elie Nehemiah, pp. 2-3.

* cited by examiner

*Primary Examiner* — Ayodeji O Ayotunde
(74) *Attorney, Agent, or Firm* — Ryan T. Grace; Advent, LLP (57) ABSTRACT

A system for tracking worker activity on a job site over a local area network. The system comprises providing a mobile device for each worker. Each mobile device has a programmable micro-processor, memory and radio modem with antenna, that is configured to emit radio signals in the form of an advertisement packet as a beacon over a simplex local network. Each mobile device has a push button for a worker to press upon completing an activity. The programmable micro-processor is configured to track time to complete an activity and handle worker interaction with the pressing of the push button by calculating the duration between consecutive button pushes and broadcasting this duration along with a device identifier within the advertisement packet over the local network.

19 Claims, 4 Drawing Sheets

(51) Int. Cl.
    *H04W 4/80*     (2018.01)
    *H04W 4/029*     (2018.01)
    *H04M 1/725*     (2006.01)
    *H04W 4/02*     (2018.01)
    *H04W 8/00*     (2009.01)
    *H04W 24/02*     (2009.01)
    *H04W 28/04*     (2009.01)
    *H04W 28/06*     (2009.01)
    *H04W 4/90*     (2018.01)
    *G01C 17/00*     (2006.01)

(52) U.S. Cl.
    CPC ..... *H04M 1/7253* (2013.01); *H04M 1/72541* (2013.01); *H04W 4/026* (2013.01); *H04W 4/029* (2018.02); *H04W 4/80* (2018.02); *H04W 8/005* (2013.01); *H04W 24/02* (2013.01); *H04W 28/04* (2013.01); *H04W 28/06* (2013.01); *G01C 17/00* (2013.01); *H04W 4/90* (2018.02); *Y04S 10/54* (2013.01)

(58) Field of Classification Search
    USPC ........................................................ 455/41.2
    See application file for complete search history.

SYSTEM AND METHOD FOR CAPTURING USER ACTIVITY USING WEARABLE DEVICES

FIELD OF INVENTION

The present invention is associated with the field of tracking user activities for mobile personal via connected wearable devices. It depicts the usage of beacon devices that can advertise data related to the device information, where about and other user activities over different radio technology, where a nearby scanning device is able to capture and decode the specific message into a traceable user activity.

The invention presents one example where the cevice is implemented as a Bluetooth Low Energy (BLE) beacon using Apple iBeacon specification to format its advertisement, and is capable to broadcast customized advertisement data, therefore enabling a nearby mobile smartphone to scan and track the start and/or completion of a job by a worker on a construction site. It is assumed that a reader skilled in the art of user activities tracking is able to easily relate to other usage of the invention in different business or consumer applications such as tracking health workers, firefighters or even kids activities among many other usage scenarios.

BACKGROUND

Traditional activities based tracking solutions of mobile workers have been focused on improving safety via automated on-site presence and location detection, or on cost reduction via business process automation by collecting on-site worker time. Moreover, product and solutions that addressed worker activities on a job site to efficiently provide task based tracking required dependency on mobile applications to enter and collect user activities.

While each category of these solutions are critically important to the success of any business, the focal point has remained heavily dependent on expensive approach that either required equipping individual worker with a smartphone or building and maintaining a proprietary network of connected devices, network nodes and gateways (such as RFID meshed network) despite major advancement in the Internet of Things (IoT) devices and connectivity.

Moreover, the proliferation of IoT networks such as Bluetooth Low Energy (BLE), WiFi, Zigbee, etc. has led to more efficient solutions for connected world in home, vehicle and business automation. Nonetheless, most of these solutions are focused on data collection such as telemetry or device interaction typically via a traditional mobile device such as smartphone, tablet or laptop.

Additionally, existing methods and systems for interacting from an IoT smart device to a connected device such as smartphone are limited to broadcasting the device information in order to communicate specific activities or proximity. In more recent effort, there have been a lots of IoT devices enabling the holder to communicate to nearby mobile device or the cloud a specific activity. For example, we recently saw the introduction of many keyfob devices that can send a message over BLE to nearby mobile device to activate a buzzer for finding the lost device. In other scenarios, the BLE keyfob can vibrate when the user moves away from her phone. In similar scenario, the keyfob is used to broadcast an emergency message with the click of a button to nearby mobile devices or to the cloud.

Our invention extends the current capability of these IoT devices to overcome the limitation of current solutions to provide efficient business automation for mobile workers.

The invention describes methods for providing accurate personnel activity tracking by delivering relevant activity context in advertised data to nearby mobile device or network gateway. In this model, both the IoT wearable device and the scanner are equipped with standard network technology such as BLE as a transmitter and receiver respectively. The wearable device for the purpose of providing an example of implementation to the reader is depicted as a smart keyfob providing one or more buttons and led lights for user interaction, and implements standard BLE beacon advertisement model using iBeacon specification; while the receiver is a standard smartphone supporting BLE 4.0+ such as an iPhone 6.

SUMMARY

According to one embodiment of the present invention, a computer implemented method, apparatus and computer usable program is provided to facilitate automated tracking of user activity for on-site workers.

At the very basic, accurately capturing on-site user presence is an important business process currently implemented in different approaches including manual attendance checking, smartphones with GPS applications, and RFID tags with fixed or mobile scanning stations.

While the attendance data can be leveraged to automate worker timesheets, other data such as accurate location of the where about of a worker can be as valuable during emergency. Additionally, the ability to capture more granular data of user activities such as the task they're working on can be even more valuable to any business to get real-time visibility on their business processes.

Thus by allowing on-site communication between the workers and their managers to capture worker activities will lead to reduced cost and improved productivity and safety on any work site without the overheads from alternative and expensive mobile app/smartphone solutions per each worker.

Hence some of the advantages of our invention are the ability to deliver accurate tracking for user activities by leveraging wearable devices that communicate efficiently with nearby smartphones/tablets carried by on-site managers or located at fixed on-site locations.

At the very basic, our system of invention describes a system and method to address reliability issues with nearable network created by the scanning smartphone to capture accurately the data from users. The disclosure herein depicts a caching mechanism in which the system of worker mobile devices, depicted in the embodiment described as wearable beacon devices, capable of advertising multiple data sets including previously cached user activities. This mechanism will therefore enable the system of the present invention at the scanning side to be able to capture lost user activities that may have been resulted from any scenario such as worker or manager being outside the capable range of beacons and scanning devices, worker is inside closed area that the radio signal can not penetrate, network range or BLE interference among other scenarios.

Secondly, the present disclosure provides systems and methods to accurately identify specific worker activities using the beacon advertisement model that can include limited set of information within few bytes of the payload. In this case, the disclosure describes a server that provides planning, sequencing and prediction of user activities, a mobile application that can discover geo-based activities on-site and maintain the predefined sequence or allow the manager to rearrange the tasks for accurate tracking of each new advertised activity from the wearable beacons.

Thirdly, the invention describes a system and method to extend the beacon custom advertisement method with additional capability to provide further features for activity tracking.

The first and second methods depict the usage of custom advertisement payload that includes the necessary information to identify the worker or beacon device, the specific performed activity along a set of most recent activities. In this advancement, the system of our invention introduces a communication protocol that fits within the available limited set of data to support different set of activities such request for assistant, emergency, breaks etc. and therefore providing further support for capturing different types of user activities.

BRIEF DESCRIPTION OF THE DRAWINGS

In order that the invention may be more clearly understood, one embodiment thereof will now be described in detail by way of example, with reference to the accompanying drawings, in which.

Similar references are used in different figures to denote similar components

DETAILED DESCRIPTION

Methods and arrangements for capturing detail user activities (such as Job Costing) using wearable beacon devices and mobile application are disclosed in this application.

Before embodiments of the invention are explained in detail, it is to be understood that the invention is not limited in its application to the details of the examples set forth in the following descriptions or illustrated drawings. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in details, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages such as the "C" programming language or similar programming languages, or scripted language such as JavaScript on Node.Js.

The program code for the scanning device may execute entirely on the user's smartphone, as a stand-alone software and hardware package or partly on the user's smartphone and partly on a remote computer or server. In the latter scenario, the scanning device may be connected to the remote server through any type of network, including mobile telecom network (3G/4G/LTE), a local area network (LAN) or a wide area network (WAN), or the connection may be made to a cloud computer (through the Internet using an Internet Service Provider).

Our method and system of invention are driven by the pressing need to provide accurate job costing product to the construction industry that disrupt existing cost inefficient methods based on smartphones, fixed stations or meshed network networks for FRID devices.

Thus providing a system and method to deliver cost efficient personal tracking solution is of tremendous value to the construction industry and to other verticals such as health, Oil and Gas, as well consumers such as kids presence at school and on-bus, in parks or events, etc.

In one embodiment of the invention the system and method of the invention depicts; an apparatus as a wearable beacon device by which a construction worker pushes a button to trigger completion of an active job; a mobile software application scanning for the beacon advertisement, and a cloud server providing the jobs and resources planning and tracking for a predefined site location along a method to capture the specific task update from the specific worker.

Figure 1:
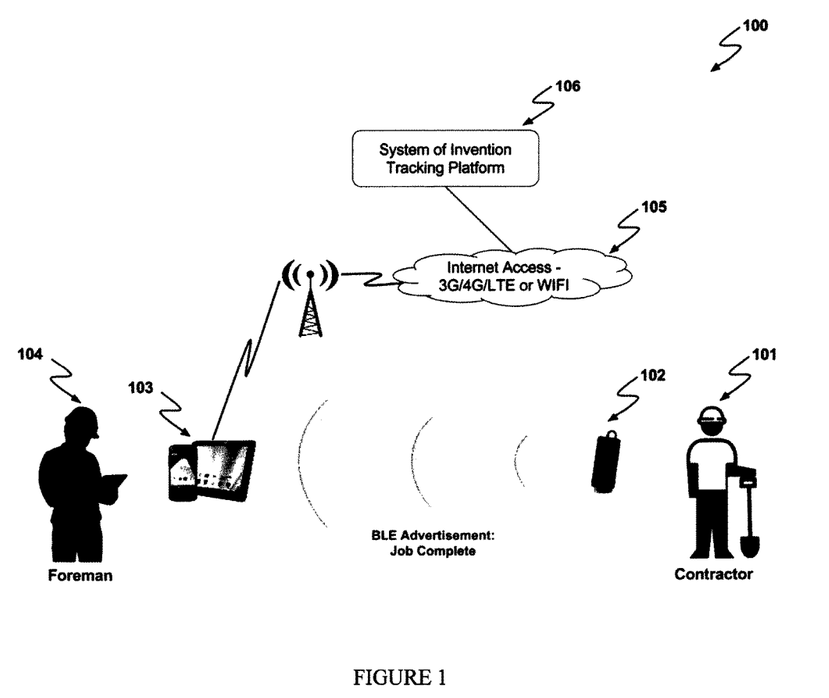
FIG. 1 is a schematic illustration of a user activity tracking system according to the present invention.

FIG. 1 shows one exemplary embodiment of the invention 100. A worker 101 pushes a soft or a hard button on the beacon device 102 in order to advertise completion of his current job.

The System of Invention software agent embedded on the beacon device builds a custom advertisement payload that includes the device identifier, the advertisement type and the duration of the task.

The beacon device 102 then starts the advertisement process over Bluetooth Low Energy (BLE) to broadcast to a nearby scanning device the status update of the current assigned task. In this example, the embedded software uses an iBeacon specification for formatting the payload where the custom data is assembled to fit in a 4 bytes data fields from the combination of Major and Minor fields respectively as defined by iBeacon specification.

The System of Invention scanning software is provided as a mobile application running on a standard Smartphone or Tablet 103 capable of scanning for BLE advertisement. The application is therefore able to decode the advertised payload to identify; the broadcasting device, the advertisement type and task duration. For a task completion advertisement type, it validates the data to ensure valid beacon identifier and task duration are provided and informs the manager 104 of the assigned task completion and duration along other relevant information such as distance away from the worker.

The manager in this example a foreman 104, a user of the scanning device may decide to review the task status for verification and approval. Upon approval or on manual trigger or automated synchronization, the application relays the data over available network connectivity 105 to our server software 106 of our System of Invention.

In one embodiment the beacon keyfob may be implemented to advertise its payload over any other radio frequencies and networks such as WiFi, ZegBee, 3G/4G/LTE, Weightless-N, or others. In this case, the System of Invention scanning software maybe embedded on a scanning device that supports the same type of radio frequency, network specification and protocol.

In another embodiment, the system of invention scanning software may get embedded on a relay system that performs only the scanning function and relays other functions such as decoding the payload, informing a user or relaying the data to the server software, to another smart connected device that performs these functions. In that case, the relay device may communicate to the smart device via serial or wireless connection and may use any radio networks and specification such as Bluetooth, ZigBee, WiFi, or others. Similarly, the system of invention scanning software may be connected to the server software via the Internet, a LAN, a WAN, a PAN or other such networks.

These are mere examples of some of the main types of networks in general use, but the invention is not limited to these examples, but in fact covers all networks that may be used to connect the different component of our system of invention—embedded software on beacon, scanning device, and server software.

In one embodiment of the invention the system and method of the invention provides a process by which a worker submits a job completion to a nearby manager.

Figure 2:
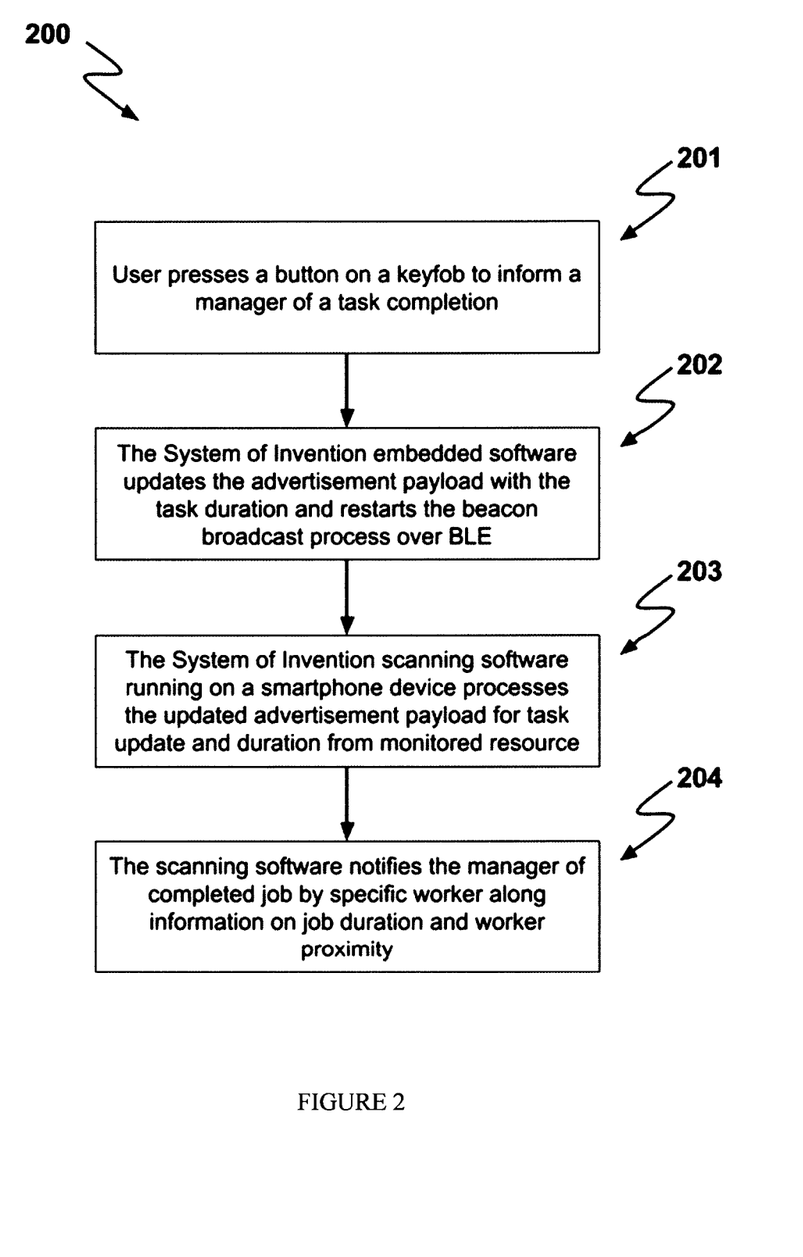
FIG. 2 is a flow chart of one method of tracking user activity using the system of FIG. 1.

FIG. 2 above shows one exemplary embodiment of the invention 200. The wearable beacon device carried by the worker is represented by 201 and 202, while the scanning device that provide a display for jobs status to a worker manager is represented by 203 and 204.

The beacon provides a multi-function push button for jobs submission. Upon finishing a job, the worker pushes the button as per 201. The embedded beacon software 202 responsible for handling the pushbutton first validates the event using a debounce or similar method to ensure non-incidental clicks. It then informs the worker of a valid click via available user interface exposed by the beacon such as multi-color led light, buzzer and/or vibration. The actual implementation of this function can be easily provided by turning the led light on and changing its color from flashing to solid green.

The beacon also provides a mechanism to calculate job duration time using by calculating time difference between two valid clicks for jobs submission extracted either from a simple counter or a proper timer.

For a valid click and job duration, the embedded software thereafter builds the custom advertisement payload that includes the device identifier, the type of advertisement and job duration and fits the data an available data beacon advertisement fields such as Major and Minor in the case of iBeacon. The embedded software thus restarts the advertisement process using the above payload as described above.

The system of invention scanning software 203 implements the underlying hosting scanning device BLE stack to continuously monitor for predefined nearby beacons in range by monitoring for specific beacon UUIDs. The software alternates from monitoring to ranging as necessary to consume battery. Monitoring is used to identify own beacons in range while ranging is used to capture the full advertisement payload for identified beacons.

The software persists all captured beacon data and constantly utilizes those to compare with new scanned data to check for changes. For new payload it validates the job update data and then inform its user—the foreman of the assigned task completion and duration along other relevant information such as distance away from the worker as shown in 204 and detailed above. Foreman is therefore able to review the jobs data and adjust if necessary.

In another embodiment the system of invention depicts a method whereby multiple jobs data is advertised and captured in order to addresses out of range or not captured jobs submission.

Figure 3:
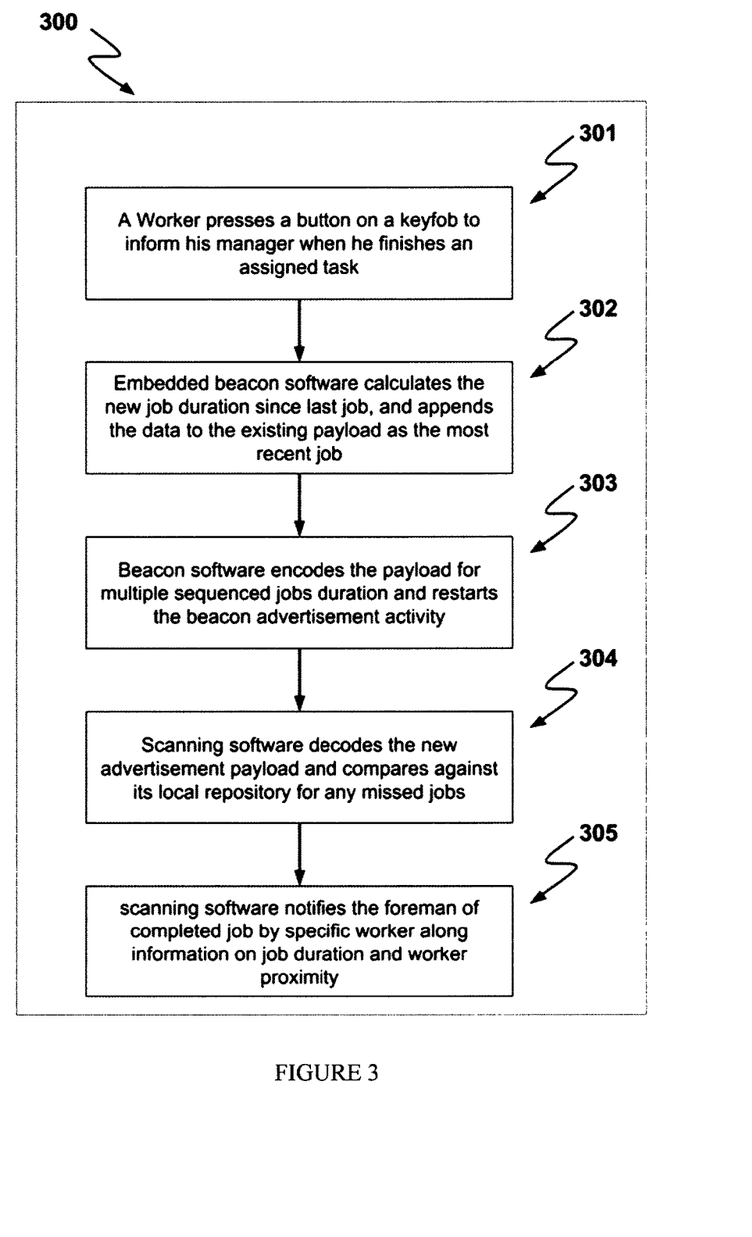
FIG. 3 is a flow chart of one method of tracking user activity where multiple activity data is advertised using the system of FIG. 1.

FIG. 3 above shows another exemplary embodiment of the invention 300 whereby an enhanced data protocol is used in the advertisement and scanning in order to address the above mentioned concerns with BLE reliability or due to interference on job sites. The method hereby detailed is at the core of our system of invention and describes key steps and different scenarios to overcome these challenges.

Thus, in one embodiment the system of invention embedded beacon software 302 handles and validates workers click events via the exposed push button as detailed in 301 and earlier for FIG. 2. The beacon embedded software persists in its repository previously advertised payload. The software implements an encoding protocol that append new job duration to previous set of advertised jobs as depicted in step 303. The software also uses a binary format to encode the payload data in a protocol that allocates a fixed block of bits per duration. In this example, the software implements 3 blocks of 5 bits each in order to allow for 3 job durations each based on 15 min increments and 8 hours maximum duration each, thus fitting in the available minor data of 16 bits. The software implements a bit shifting method to manipulate the payload data in a manner that when a new job is appended to the payload, the software shifts the blocks of bits to the rights, hence dropping the right side block or the earliest job and appending the new block to the left of the data packet. Once, the bits manipulation is completed, the software thereafter converts the bits into an unsigned 16 bits integer and assigns the resulting value into the Minor field of the iBeacon specification and starts thereafter the beacon advertisement process.

In another embodiment, the system of invention can extend the number of job duration advertised by enhancing the protocol to support payload concatenation in which the first bit is utilized to specific the concatenation number and the remaining blocks of bits is used exactly as described in the above embodiment. In this scenario, the software configures the beacon to advertise the concatenation payloads separated by short interval such as 100 millsec.

Alternatively, the embedded software can advertise each set of concatenated payload data into one of the predefined BLE channels and thus allowing up to 3 concatenated payload each capable of including 3 job durations.

Using the same approach, the 3 blocs of 5 bits each can be reconfigured to support 2 larger blocks that each can fit 6 bits for shorter duration increment such as 5 min, and/or larger maximum duration.

In one embodiment, the scanning software 304, monitoring for own beacon, frequently ranges to capture the full payload and decodes the payload data using the reverse algorithm of encoding used by the beacon embedded software. In 305, the software frequently checks for new advertised jobs by comparing the decoded data with previously received and persisted data. The software compares all jobs to ensure it captures any missed new job submission in scenario where the worker and the foreman were out of range for some time and during any job submission. It then informs the foreman of the assigned task completion and duration as previously described in FIG. 2.

In another embodiment, the system of invention scanning software 103 connected to system of invention planning and tracking server 106 over Internet connection, frequently pulls the server for new jobs and assigned resources based on its current location. The server responsible for job sequencing per resource allows thus the scanning software to maintain the sequencing of retrieved jobs for each monitored worker. Moreover, the scanning software allows the foreman to easily reorder the job sequencing on demand in order to adjust to real-time scenario of construction site. Thus the scanning software when validating a new scanned advertisement payload, it uses the predefined sequence for a specific worker to ensure it correlates the updated job duration from the beacon with the appropriate job. It uses the same method to ensure the correlation is maintained when multiple job updates are received at once after an out of range scenario.

In one embodiment, the system of invention provides a method and process for allowing a worker to communicate with the on-site manager for other needs beside the job costing main function of the pushbutton on the beacon. In this case, the button is implemented as a multi-function button. When a worker 101 clicks and holds the button down, our system of invention embedded software handles the different events of the button such as onClick, onHold, onRelease, etc. When in onHold event is detected, the software cycles through the different functions with some delay to allow for release. Upon release, the specific function can be enabled. The software also informs the worker of the state of the button and the selected feature by cycling also through the different colors of the led light or buzzers and vibrations. For example, the software can be programmed to assign green for job submission, blue for assistant, red for emergency, yellow for administration, etc. When the worker is cycling through the different functions, the software will change the led color accordingly, and when released it activates the specific function and turns the assigned led color into flashing light with a timer for auto deactivate. Once in a flashing mode, the worker can click the button again to submit the request within a short delay for example 3 seconds. Alternatively, the multi-function button can be programmed in any other method such as one click for job submission, double clicks for assistance, click and hold for 3 seconds to request help, etc. Regardless of the user interface it's important to identify the method of invention which depicts a communication protocol over the advertisement channels which can use a single channel or more to deliver the necessary information for multiple message types and advertise one or more at the same time to communicate to the scanning software a single or multiple job updates, commands or a workflow of chained commands. For example, the worker can push the button in a specific sequence of event such to inform his foreman to come find him for instruction on the next job once he receive his update for the current job.

In another embodiment, the system of invention depicts a method and a process where a foreman can initiate a request from his scanning device to the worker beacon device to find the foreman or provide proximity direction guidance to the foreman as depicts below.

Figure 4:
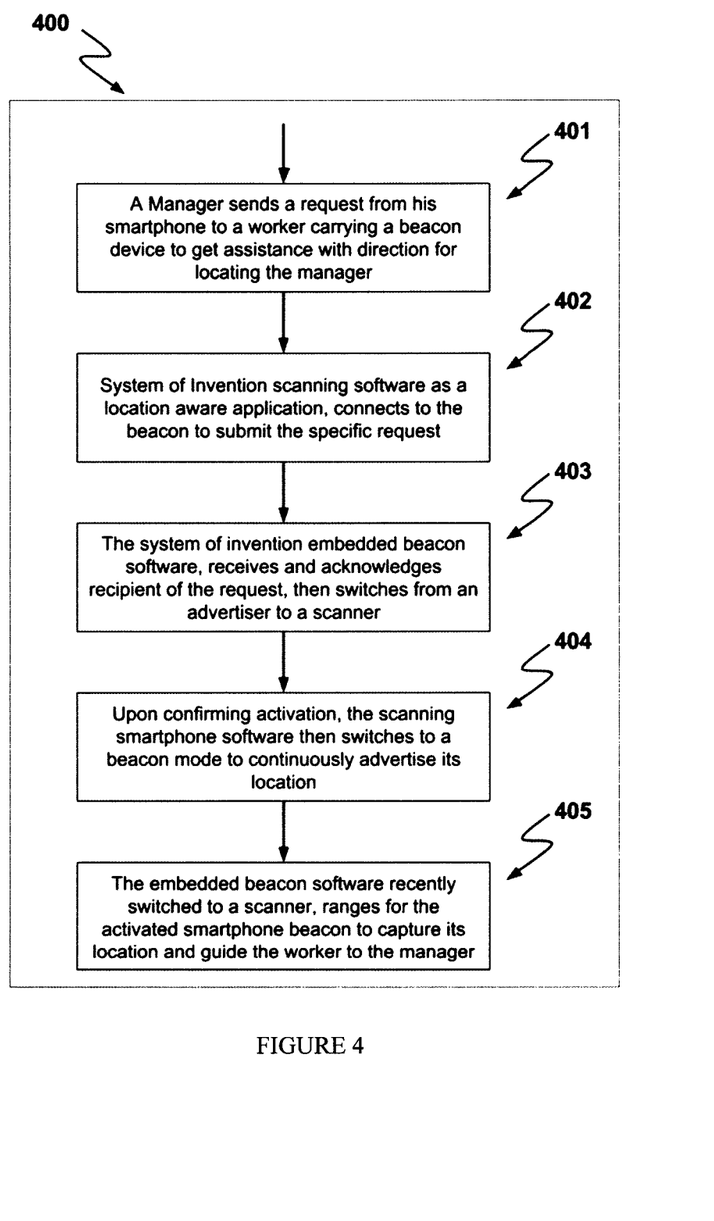
FIG. 4 is a flow chart of one method of tracking user activity where a reversed beacon-scanner is used.

FIG. 4 below shows another exemplary embodiment of the invention 400 whereby a reversed beacon-scanner model is used to allow the worker to find his Foreman.

A foreman using the system of invention scanning software on his smartphone 401 selects a worker carrying the system of invention beacon to request help with guidance to find the foreman. In 402 the scanning software stops its scanning activity to connect to the specific beacon and submit the help request.

In 403, the system of invention targeted embedded beacon software, upon receiving the request, stops its beacon advertisement mode and sends an acknowledgement to the initiating scanning software. It thereafter switches to a scanner mode and starts monitoring for a specific beacon UUID received in the message.

Thereupon confirming of recipient of the message, the scanning smartphone software disconnect from the worker beacon, and switch to a beacon mode that advertises its information and location captured from the underlying smartphone GPS as show in 404.

The beacon thereafter starts scanning for the specific beacon UUID as in 405. Upon capturing of data using a similar protocol decoder as above, it uses the multi-color led light to guide the worker with the walking direction. In this model, green is used for right while blue is for left and red to go straightforward. The system of invention software is capable of predicting the direction based on beacon TX power that maps to distance along the received smartphone geo-coordinate in the advertisement payload.

The invention claimed is:

1. A system for tracking worker activity on a job site over a local area network, comprising a mobile device for each worker, each mobile device comprising a programmable micro-processor, memory and radio modem with antenna, that is configured to emit radio signals in the form of an advertisement packet as a beacon over a simplex local network; each mobile device having a push button for a worker to press upon completing an activity; the programmable micro-processor is configured to track time to complete an activity and handle worker interaction with the pressing of the push button by calculating the duration between consecutive button pushes and broadcasting this duration along with a device identifier within the advertisement packet over the local network.

2. A system according to claim 1 further comprising a supervisor mobile device having a programmable a programmable micro-processor, that is configured to receive the advertisement packets from each worker; the programmable micro-processor configured to track time for each worker to complete an activity.

3. A system according to claim 2 wherein the supervisor mobile device is configured to scan for the advertisement packets of each worker and is configured to; a. Decode the advertised packet into an activity duration for each worker b. Store information for an operator to assign the captured duration to a specific worker activity c. Relay the information to a cloud server via an internet connection either immediately or upon verification by the operator.

4. The system of claim 3 wherein the duration is transformed and encoded with a scaling algorithm in order to deliver bigger duration in each packet.

5. The system of claim 4 wherein the system improves the reliability of a BLE signal and reduce the risk of data loss when the broadcaster and scanner are out of range for a long time, by; a. storing a large number of previous activities duration, b. broadcasting a set of the most recent durations that can fit in the data packet using last in/first out algorithm, c. transforming the data with a scaling algorithm enabling to deliver larger amount of time duration in each packet, d. tagging the advertising packet with a concatenation identifier in order to chain and sequence multiple advertisement packets.

6. The system of claim 5 further consisting of a flexible protocol to deliver different commands over a single data packet, such as type of activity (start of job, end of job, punch-in, break, etc.).

7. The system of claim 1, wherein the programmable micro-processor of each mobile device is configured to handle and interpret multiple clicks into different activity types and long hold for emergency and sending a panic alert.

8. The system of claim 7 wherein the different activity types are selected from the group consisting of job duration, job canceling, requesting help or find me.

9. The system of claim 1, wherein data is transformed and encoded for maximum data fitting in a single advertisement packet.

10. A system according to claim 2 configured to predict the actual activity for each received duration, consisting of;
   a. having the operator enter a daily plan as sequence of activities for each worker,
   b. reconstructing the timeline of activities for each worker from the received sequence of durations,
   c. mapping the reconstructed timeline of activity duration to the planned activities and thereafter assigning each duration to the correlated activity.

11. The system of claim 10, wherein the daily plan is automatically loaded from the cloud server without requesting the operator to manually enter a daily plan.

12. The system of claim 10, further embodying context aware to the scanner and the cloud data storage system to accurately load different sequences of activities for each worker at specific worksites based on location and time automatically.

13. The system of claim 10, further consisting of transforming the timeline into accurate work-logs by; a. Comparing local stored durations with the new received packet b. Scaling down or up individual durations to compensate for already scaled duration during the packet encoding on the mobile device of claim 1, c. Shifting back or scaling down the most recent duration where the last activity will go beyond the current time on the scanner system, d. Trimming the first duration by aligning its start with the first breadcrumb for presence of the beacon to align with the start of day/shift on the scanning software.

14. The system of claim 13, further configured to filter invalid durations/clicks that are triggered off-shift using its shift aware context.

15. The system of claim 13, further configured to filter invalid durations/clicks that are determined to be triggered off-site by executing a pattern matching processing analysis for the proximity data persisted as breadcrumbs over the timeline with the worksite zone to eliminate out-of-range scenarios.

16. The system of claim 2, wherein supervisor mobile device is configured to allow an operator to find the location of each a specific worker, by;
   a. Connecting to a worker's mobile device to switch its behavior from an advertiser to an observer,
   b. Thereafter switching its own behavior from an observer to an advertiser,
   c. triangulating the worker's mobile device's location determine its relative compass position
   d. thereafter appending the relative positioning to the advertised packet.

17. The system of claim 16, wherein the supervisor mobile device initially acts as an advertiser, handles the request from the workers mobile device and starts listening for a signal from a specific workers mobile device.

18. The system in claim 17, capable of decoding and analysing each advertisement packet to define a navigation path for a workers mobile device toward the requesting supervisor mobile device.

19. The system of claim 18, further providing navigation direction via four LEDs wherein each LED is assigned a relative direction such as North, East, South and West.

* * * * *